(No Model.)

F. R. WELLS.
SKILLET CAP.

No. 315,196. Patented Apr. 7, 1885.

WITNESSES:
C. Neveux
C. Sedgwick

INVENTOR:
F. R. Wells
BY Munn & Co.
ATTORNEYS.

UNITED STATES PATENT OFFICE.

FRANK R. WELLS, OF LAGONDA, OHIO, ASSIGNOR TO HIMSELF, WILLIAM WASHINGTON NEAL, AND PHILIP HAERR, ALL OF SAME PLACE.

SKILLET-CAP.

SPECIFICATION forming part of Letters Patent No. 315,196, dated April 7, 1885.

Application filed March 8, 1884. (No model.)

*To all whom it may concern:*

Be it known that I, FRANK R. WELLS, of Lagonda, in the county of Clark and State of Ohio, have invented certain new and useful Improvements in Skillet-Caps, of which the following is a full, clear, and exact description.

This invention relates to caps or shields open at their tops and designed to be placed on skillets or frying-pans to prevent the grease from spattering when cooking meat or other substances in said or other like vessels, and to protect the stove, kitchen-wall, or other articles or parts of the room from being splashed with flying grease or greasy particles, which, by means of the cap or shield, are conducted, after striking the inner sides of the same, back into the pan, and which, by being prevented from settling on the top of the stove, obviate much of the disagreeable and stifling odor attendant upon frying. Such shields also protect the person engaged in cooking, and, unlike a close cap or top, serve, by the free vent for vapor, to give a better flavor to the meat or substance being cooked, as well as to provide, without removing the shield, for the insertion of a fork from above to turn the meat or articles being cooked.

My improved skillet-cap or pan-shield possesses several advantages. Thus it is made with continuous close sides, though open ends, and tapers upward, which facilitates the return of the flying grease to the pan, and is formed with a raised exterior flange near its bottom end, which provides for return of drippings back into the pan, and adapts the device, having fixed dimensions, to pans or vessels of different sizes. It also is made with a handle hinged to the top of the body of the shield, capable of being turned over into the interior of the body to facilitate cleaning and brightening the shield, also the packing of it for transportation purposes.

Reference is to be had to the accompanying drawings, forming part of this specification, in which similar letters of reference indicate corresponding parts in both the figures.

Figure 1:
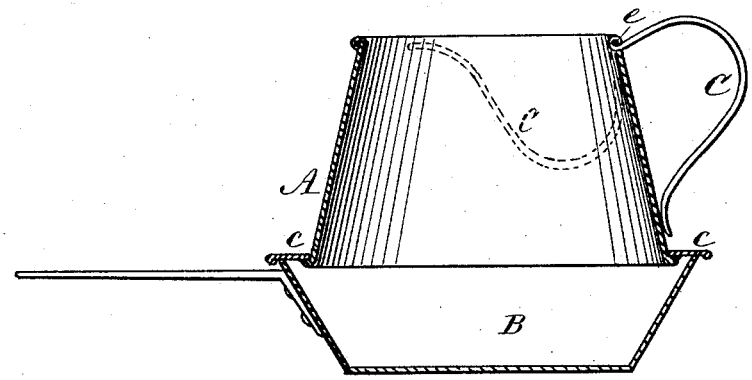
Figure 2:
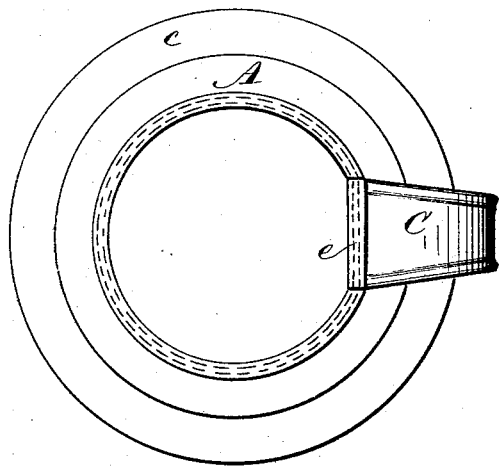

Figure 1 represents a vertical section of my improved skillet-cap or pan-shield and pan or skillet on which it is placed, and Fig. 2 is a plan view of said cap or shield.

A indicates the body of the shield, which, made of metal, has its sides continuous—that is, without an open seam or joint—thus providing for its being easily cleaned and causing it to preserve its form. Said body is made tapering upward, thereby more readily returning any grease that may fly from the meat or substance being cooked in the pan or skillet B. Secured to it, around or near its lower edge, is a raised exterior flange, $c$, which not only serves to return any grease or drippings back into the pan, but to form a base for the shield to rest by upon the top of the pan, and to adapt it to pans or skillets of different diameters.

C is the handle, which is a bow one, hinged at its upper end, as at $e$, to or near the top open end of the body A, but loose at its lower end, whereby it may be readily turned over into the inside of the body, as shown by dotted lines in Fig. 1, which will greatly facilitate the cleaning of the shield and favors close packing for transportation or shipment.

I am aware that a pan has been provided with a hinged handle adapted to be folded within the pan, and I do not claim such as of my invention.

Having thus described my invention, I claim as new and desire to secure by Letters Patent—

As an improved article of manufacture, a skillet cap or cover consisting of a hollow body portion open at both ends, the raised flange $c$ around the lower end of said body portion, and the handle C, pivoted at one end to the upper end of the body portion, and bent so that its other end bears against the side of the skillet-cap, and constructed to fold within the same, substantially as set forth.

FRANK R. WELLS.

Witnesses:
   H. S. SHOWERS,
   B. F. SPALDING.